United States Patent
Lee et al.

(10) Patent No.: US 7,848,332 B2
(45) Date of Patent: Dec. 7, 2010

(54) METHOD AND APPARATUS FOR CLASSIFYING A NETWORK PROTOCOL AND ALIGNING A NETWORK PROTOCOL HEADER RELATIVE TO CACHE LINE BOUNDARY

(75) Inventors: William Lee, Cary, NC (US); Michael Wright, Raleigh, NC (US); Joydeep Chowdhury, Cary, NC (US); Sriram Haridas, Cary, NC (US); Martin Hughes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1115 days.

(21) Appl. No.: 10/988,754

(22) Filed: Nov. 15, 2004

(65) Prior Publication Data

US 2006/0104268 A1    May 18, 2006

(51) Int. Cl.
*H04L 12/56* (2006.01)
(52) U.S. Cl. .................. 370/395.5; 370/395.7; 370/428; 370/469; 370/473
(58) Field of Classification Search .................. 370/401, 370/389, 258, 395.5, 395.7, 428, 469, 473
See application file for complete search history.

(56) References Cited

U.S. PATENT DOCUMENTS

| | | | | |
|---|---|---|---|---|
| 5,025,366 | A * | 6/1991 | Baror | 711/128 |
| 5,185,878 | A * | 2/1993 | Baror et al. | 711/123 |
| 6,111,886 | A * | 8/2000 | Stewart | 370/438 |
| 6,147,976 | A * | 11/2000 | Shand et al. | 370/254 |
| 6,317,805 | B1 * | 11/2001 | Chilton et al. | 714/800 |
| 6,427,179 | B1 * | 7/2002 | Amrany et al. | 710/64 |
| 6,621,829 | B1 * | 9/2003 | Achilles et al. | 370/468 |
| 6,658,480 | B2 * | 12/2003 | Boucher et al. | 709/239 |
| 7,155,576 | B1 * | 12/2006 | Garner et al. | 711/137 |
| 7,206,862 | B2 * | 4/2007 | Wheeler | 709/245 |
| 7,317,693 | B1 * | 1/2008 | Roesch et al. | 370/252 |
| 7,464,243 | B2 * | 12/2008 | Haridas et al. | 711/170 |
| 7,533,184 | B2 * | 5/2009 | Miller et al. | 709/236 |
| 2001/0023482 | A1 * | 9/2001 | Wray | 713/151 |
| 2002/0116501 | A1 * | 8/2002 | Ho et al. | 709/227 |
| 2002/0191573 | A1 * | 12/2002 | Whitehill et al. | 370/338 |
| 2003/0028822 | A1 * | 2/2003 | Miller et al. | 714/25 |

(Continued)

OTHER PUBLICATIONS

Direct Deposit—When Message Passing meets Shared Memory; Thomas M. Sticker; May 19, 2000.*

*Primary Examiner*—Salman Ahmed
(74) *Attorney, Agent, or Firm*—Brinks Hofer Gilson & Lione

(57) ABSTRACT

Techniques for routing a payload of a first network protocol, which includes header information for a second network protocol, include communicating a packet. In a circuit block, a first type for the first network protocol and a second type for the second network protocol are determined. The circuit block stores a classification that indicates a unique combination of the first type and the second type. A general purpose processor routes the packet based on the classification. Processor clock cycles are saved that would be consumed in determining the types. Furthermore, based on the classification, the processor can store an offset value for aligning the header relative to a cache line. The circuit block can store the packet shifted by the offset value. The processor can then retrieve from memory a single cache line to receive the header, thereby saving excess loading and ejecting of cache.

53 Claims, 9 Drawing Sheets

U.S. PATENT DOCUMENTS

| | | | |
|---|---|---|---|
| 2003/0118022 A1* | 6/2003 | Kulkarni et al. | 370/392 |
| 2005/0060428 A1* | 3/2005 | Corl et al. | 709/240 |
| 2005/0195820 A1* | 9/2005 | Betts et al. | 370/392 |
| 2006/0104268 A1* | 5/2006 | Lee et al. | 370/389 |
| 2009/0182874 A1* | 7/2009 | Morford et al. | 709/224 |
| 2010/0023682 A1* | 1/2010 | Lee et al. | 711/103 |
| 2010/0023726 A1* | 1/2010 | Aviles | 711/216 |

* cited by examiner

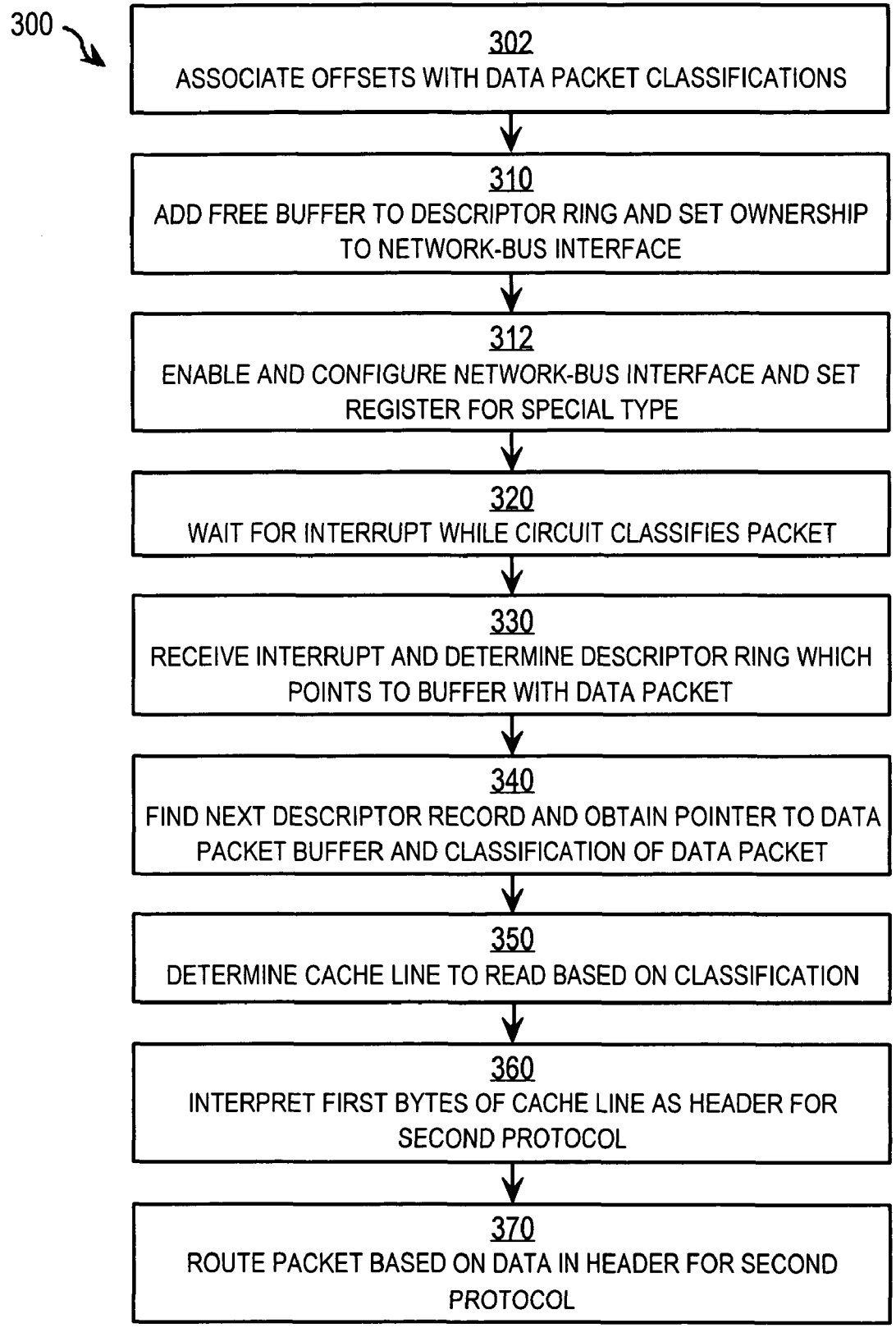

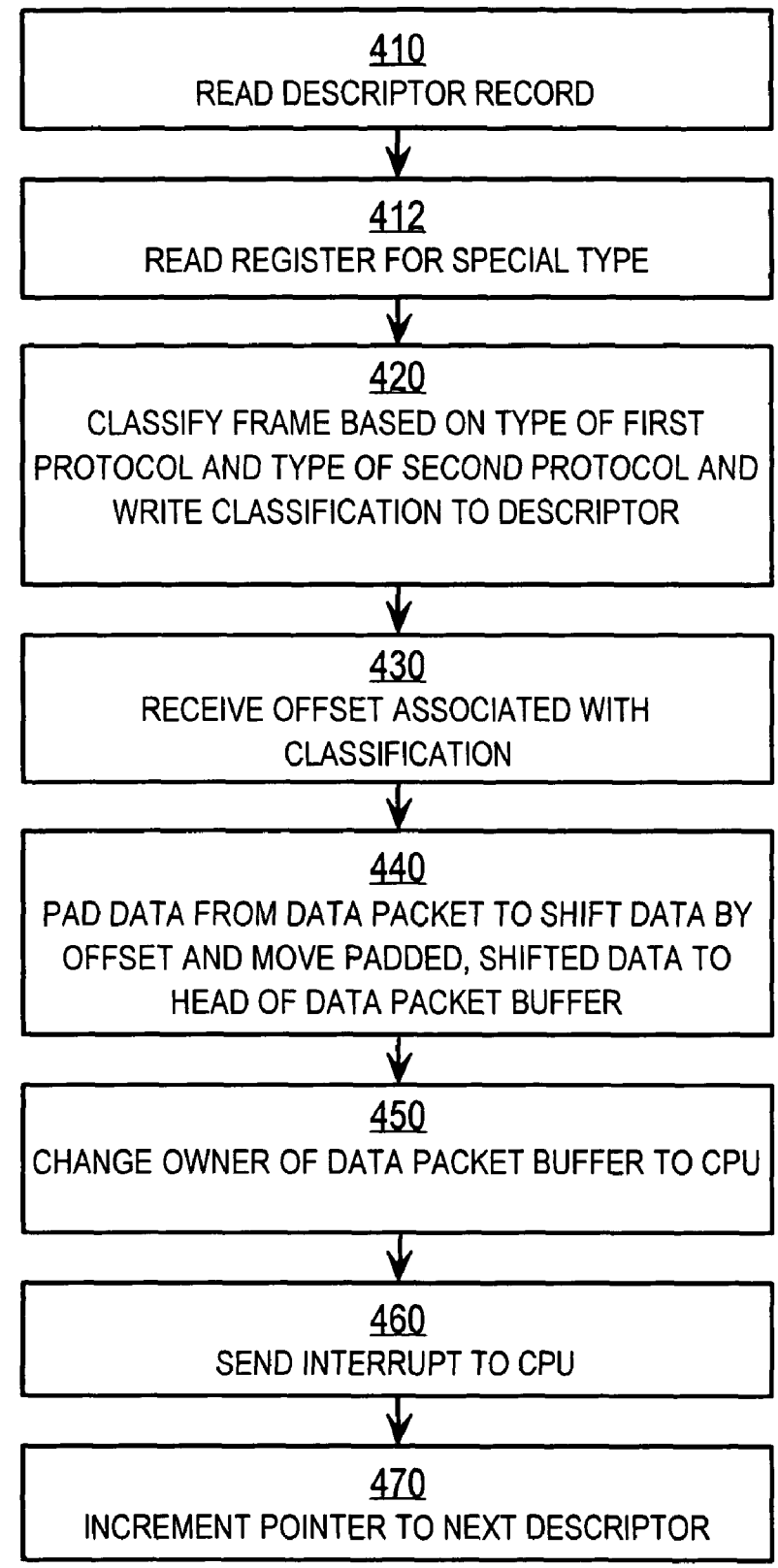

FIG. 5A

| 580 | 522 CLASSIFICATION | 524 BYTES 13:14 | 526 BYTES 15:16 | 528 BYTES 17:18 | 530 BYTES 19:20 | 532 BYTES 21:22 | 534 BYTES 23:24 | 536 BYTES 25:26 | 538 BYTES 27:28 | 540 BYTES 29:30 |
|---|---|---|---|---|---|---|---|---|---|---|
| 501 | ARPA_MPLS | h8847 OR h8848 | | | | | | | | |
| 502 | ARPA_IP | h0800 OR h86DD | | | | | | | | |
| 503 | ARPA_SPECIAL | hXXXX | | | | | | | | |
| 504 | SNAP_MPLS | <h0600 OR h8870 | hAAAA | | | h8847 OR h8848 | | | | |
| 505 | SNAP_IP | <h0600 OR h8870 | hAAAA | | | h0800 OR h86DD | | | | |
| 506 | SNAP_SPECIAL | <h0600 OR h8870 | hAAAA | | | hXXXX | | | | |
| 507 | VLAN_ARPA_MPLS | h8100 | | h8847 OR h8848 | | | | | | |
| 508 | VLAN_ARPA_IP | h8100 | | h0800 OR h86DD | | | | | | |
| 509 | VLAN_ARPA_SPECIAL | h8100 | | hXXXX | | | | | | |

FIG. 5B

| 522 CLASSIFICATION | 524 BYTES 13:14 | 526 BYTES 15:16 | 528 BYTES 17:18 | 530 BYTES 19:20 | 532 BYTES 21:22 | 534 BYTES 23:24 | 536 BYTES 25:26 | 538 BYTES 27:28 | 540 BYTES 29:30 |
|---|---|---|---|---|---|---|---|---|---|
| 510 VLAN_SNAP_MPLS | h8100 | | <h0600 OR h8870 | hAAAA | | | h8847 OR h8848 | | |
| 511 VLAN_SNAP_IP | h8100 | | <h0600 OR h8870 | hAAAA | | | h0800 OR h86DD | | |
| 512 VLAN_SNAP_SPECIAL | h8100 | | <h0600 OR h8870 | hAAAA | | | hXXXX | | |
| 513 QINQ_ARPA_MPLS | h9100 OR h8100 | | h8100 | | h8847 OR h8848 | | | | |
| 514 QINQ_ARPA_IP | h9100 OR h8100 | | h8100 | | h0800 OR h86DD | | | | |
| 515 QINQ_ARPA_SPECIAL | h9100 OR h8100 | | h8100 | | hXXXX | | | | |
| 516 QINQ_SNAP_MPLS | h9100 OR h8100 | | h8100 | | <h0600 OR h8870 | hAAAA | | | h8847 OR h8848 |
| 517 QINQ_SNAP_IP | h9100 OR h8100 | | h8100 | | <h0600 OR h8870 | hAAAA | | | h0800 OR h86DD |
| 518 QINQ_SNAP_SPECIAL | h9100 OR h8100 | | h8100 | | <h0600 OR h8870 | hAAAA | | | hXXXX |
| 519 OTHER | | | | | | | | | |

METHOD AND APPARATUS FOR CLASSIFYING A NETWORK PROTOCOL AND ALIGNING A NETWORK PROTOCOL HEADER RELATIVE TO CACHE LINE BOUNDARY

BACKGROUND OF THE INVENTION

1. Field of the Invention

The present invention relates to routing packets through a network based on header information in a payload of a packet received at a network device; and, in particular, to increasing efficiency by classifying the packet using hardware and aligning the header information with respect to a boundary of a cache line exchanged between memory and a processor in the network device.

2. Description of the Related Art

Networks of general purpose computer systems connected by external communication links are well known. The networks often include one or more network devices that facilitate the passage of information between the computer systems. A network node is a network device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information. New protocols are developed to meet perceived needs of the networking community, such as a sub-network access protocol (SNAP), a virtual local area network (VLAN) protocol and a nested VLAN (QINQ) protocol. SNAP allows for the transmission of IP datagrams over Ethernet LANs. SNAP is a media independent header specified as an IEEE standard 802.2, which can be found at the world wide web domain ieee.org, the entire contents of which are hereby incorporated by reference as if fully set forth herein. The VLAN protocol is used by a group of devices on one or more LANs that are configured so that they can communicate as if they were attached to the same wire, when in fact they are located on a number of different LAN segments. The VLAN tagging is described at the time of this writing in IEEE standard 802.3ac available from the world wide web domain named ieee.org, the entire contents of which are hereby incorporated by reference as if fully set forth herein. The QINQ protocol is described at the time of this writing in the IEEE 802.1ad standard found at ieee.org the entire contents of which are hereby incorporated by reference as if fully set forth herein. Some protocols follow a layer 2 protocol and precede a layer 3 protocol; and are said to be layer 2.5 protocols. For example, the multi-protocol layer switch (MPLS) is a layer 2.5 protocol. The MPLS protocol provides for the designation, routing, forwarding and switching of traffic flows through the network. MPLS is described at the time of this writing in Internet Engineering Task Force (IETF) request for comments (RFC) 3031 and RFC 3032 which can be found at the world wide web domain www.ietf.org in files named rfc3031.txt and rfc3031.tx in the file directory named rfc, the entire contents of which are hereby incorporated by reference as if fully set forth herein. In the following, an IEEE 802 protocol that does not involve such extensions as SNAP, VLAN, or QINQ is called an ARPA EIN protocol, after the original Ethernet implementation developed by the Advance Research Projects Agency (ARPA).

Routers and switches are network devices that determine which communication link or links to employ to support the progress of packets through the network. Routers and switches can employ software executed by a general purpose processor, called a central processing unit (CPU), or can employ special purpose hardware, or can employ some combination to make these determinations and forward the packets from one communication link to another. Switches typically rely on special purpose hardware to quickly forward packets based on one or more specific protocols. For example, Ethernet switches for forwarding packets according to Ethernet protocol are implemented primarily with special purpose hardware.

While the use of hardware processes packets extremely quickly, there are drawbacks in flexibility. As protocols evolve through subsequent versions and as new protocols emerge, the network devices that rely on hardware become obsolete and have to ignore the new protocols or else be replaced. As a consequence, many network devices, such as routers, which forward packets across heterogeneous data link networks, include a CPU that operates according to an instruction set (software) that can be modified as protocols change.

Software executed operations in a CPU proceed more slowly than hardware executed operations, so there is a tradeoff between flexibility and speed in the design and implementation of network devices.

Some current routers implement sophisticated algorithms that provide high performance forwarding of packets based on combining layer 2 and layer 2.5 or layer 3 header information, or some other combination. For example, instead of making forwarding decisions separately on each packet in a stream of related packets directed from the same source node to the same destination node, these routers identify the packet stream from a unique signature derived from the layer 2 and layer 3 header information and forward each member of the stream according to the same decision made for the first packet in the stream. Because layer 2 headers are of variable length, depending on the protocol, the layer 3 header information may occupy different positions in the payloads of different packets. Because the layer 2 protocols may evolve in time, the processing of information from the layer 2 payload can advantageously be done using software and a CPU in the router.

For example, the Cisco Express Forwarding (CEF) software employed in routers, such as the Cisco 2600 Multiservice Platform router, recently available from Cisco Systems Incorporated of San Jose, Calif., determines the position of the layer 3 header information in a layer 2 payload and examines the layer 3 header information in memory. It has been estimated that the execution of software to find and examine the layer 3 header information in every packet received by the router involves about 10% of the CPU processing consumed by the router for packets with only the basic set of features enabled.

Additionally, it has been estimated that the software penalty for examining the packet header which is not aligned is 10% of the CEF processing. Processing of the misaligned packet header not only causes additional cache lines to be read into the CPU data cache, it also requires the CPU to perform extra work to extract misaligned header fields, such as the 32-bit IP destination address as one example. This extra work includes additional load instructions, where one load instruction might suffice on a properly aligned header, as well as shifting and concatenating the data returned from the load instructions to form the desired single field. Some of the CPU processing is directed to executing extra logic to handle different misalignments for different types of packets.

The throughput of many current routers is limited by the processing capacity of the CPU, i.e., the router performance is said to be CPU limited. To improve throughput of such routers, it is desirable to relieve the CPU load and replace some of the software functionality with hardware functionality, without losing the flexibility to adapt to evolving protocols.

Based on the foregoing, there is a clear need to provide a hardware assist to find and retrieve the layer 2.5 and layer 3 header information in every packet received by the router without losing the flexibility to adapt to evolving protocols. In general, there is a need to provide a hardware assist to find and retrieve header information for a network protocol encapsulated in the payload of a lower layer network protocol.

SUMMARY OF THE INVENTION

Techniques are provided for reducing the CPU processing load consumed for routing packets based on information in a first protocol header and a second protocol header encapsulated by the first protocol.

In one set of embodiments for routing information in a payload of a first network protocol, which includes header information for a second network protocol, an apparatus includes a network interface, a memory for storing information, a circuit block and one or more processors. The network interface is coupled to a network for communicating a packet with the network. The circuit block is configured to determine a first type for the first network protocol and a second type for the second network protocol based on information in the packet and to store into the memory classification data that indicates a unique combination of the first type and the second type. The apparatus also includes one or more sequences of instructions in a computer-readable medium, which, when executed by the one or more processors, causes a processor to route the packet based at least in part on the second network protocol without determining the first type and the second type based on information in the packet. Thereby, processor clock cycles are avoided that would otherwise be consumed in determining the first type and the second type.

In some embodiments of the first set, the circuit block also receives an offset value based on the classification data. The offset value indicates a number of bits (expressed, for example, as a number of 8-bit bytes) for aligning the header for the second network protocol relative to a boundary of a cache line for moving data between the memory and the one or more processors. The circuit block stores the packet into memory shifted by the number of bits indicated by the offset value. The sequence of instructions further causes the one or more processors to receive the header for the second networking protocol by retrieving not more than one cache line. Thereby, additional cache line loads and ejections are avoided, along with commensurate consumption of multiple processor and bus clock cycles per cache movement, which would otherwise be expended to receive an unaligned header for the second networking protocol. Furthermore, processor clock cycles can be avoided that would otherwise be used in determining where in the cache line the header for the second protocol begins.

In some embodiments of the first set, determining the first type and the second type includes comparing a value in a type field in the packet to a special value in a programmable register, thereby allowing the circuit block to identify a protocol type not known when the circuit block was designed.

In some embodiments of the first set, the instructions further cause a processor to form multiple descriptor rings corresponding to different values for the classification data. A descriptor ring stores a plurality of descriptor records that each point to a packet data buffer where the packet is stored in the memory. In some of these embodiments, a processor uses a limited instruction set for a particular combination of protocols when processing data for a particular descriptor ring corresponding to the particular combination of protocols. As a result, there is a reduction in a number of instructions transferred from memory to an instruction cache in the processor.

In other sets of embodiments, methods, a computer readable medium, and other apparatus provide corresponding functions described for the apparatus of the first set of embodiments.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flow diagram that illustrates a method for processing a packet in the CPU of a router, according to an embodiment;

FIG. 4 is a flow diagram that illustrates a method for processing a packet in the network-bus interface of FIG. 2B, according to an embodiment;

FIG. 5A and FIG. 5B constitute a table that illustrates contents of type fields in the headers for a variety of layer 2 protocols for classification, according to an embodiment.

DETAILED DESCRIPTION

A method and apparatus are described for classifying network packets in hardware. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments are described in the context of routing packets based on information in the data link layer (layer 2) and internetwork layers (layer 3) and in between layer (layer 2.5); but, the invention is not limited to this context. In some embodiments, the routing of packets may be based on information in the header or payloads of protocols involving different layers.

1.0 Network Overview

Figure 1A:
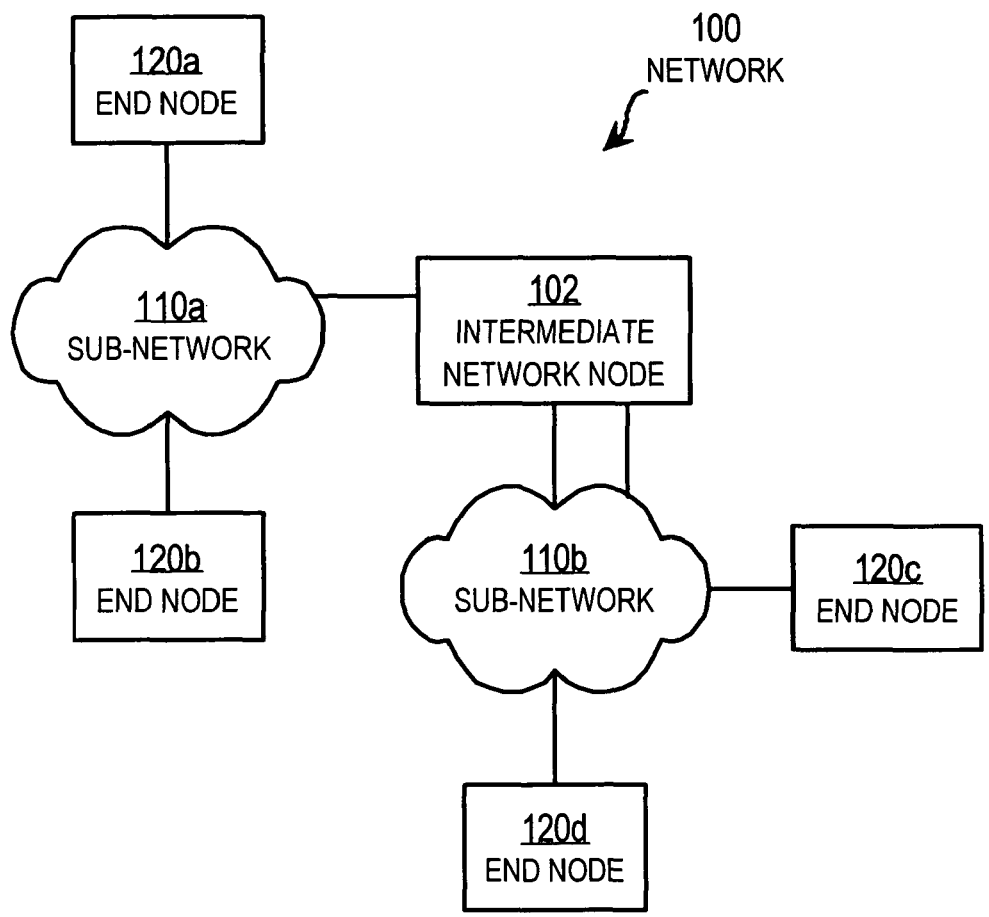
FIG. 1A is a block diagram that illustrates a network, according to an embodiment.

FIG. 1A is a block diagram that illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110b includes one or more intermediate network nodes. Although, for purposes of illustration, intermediate network node 102 is connected by one communication link to sub-network 110a and thereby to end nodes 120a, 120b and by two communication links to sub-network 110b and end nodes 120c, 120d, in other embodiments an intermediate network node 102 may be connected to more or fewer sub-networks 110 and directly or indirectly to more or fewer end nodes 120.

Figure 1B:
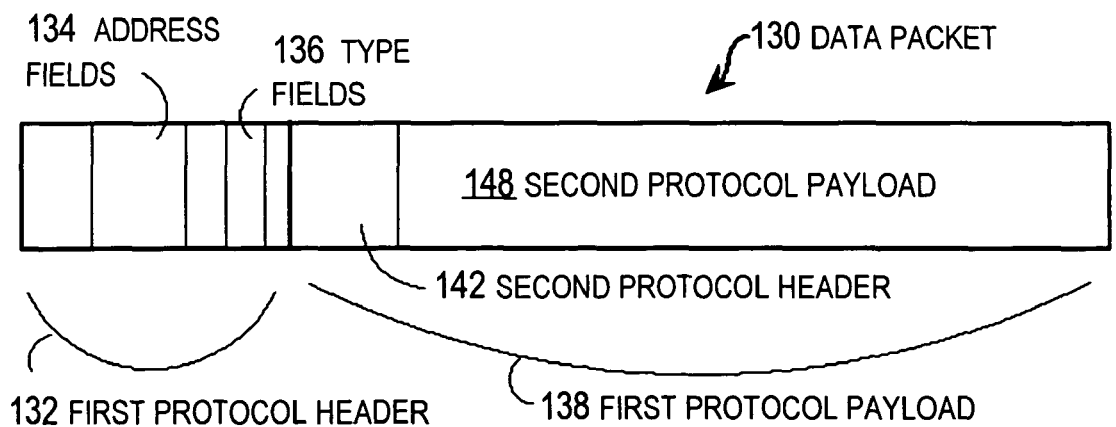
FIG. 1B is a block diagram that illustrates a packet of data communicated over a network.

FIG. 1B is a block diagram that illustrates a packet 130 communicated over a network, such as network 100. Each packet typically comprises one or more payloads of data, e.g. payloads 138, 148, each encapsulated by at least one network header, e.g., headers 132, 142, respectively. For example, payloads are encapsulated by appending a header before the payload, sometimes called prepending a header, and sometimes by appending a tail after the payload. Each header 132, 142 is formatted in accordance with a network communication protocol; header 132 is formatted according to a first protocol and header 142 is formatted according to a second protocol. The header 142 for the second protocol is included within the payload 138 of the first protocol. The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver address for the first protocol is located within the packet 130. As described above, a packet's network headers include at least a data-link (layer 2) header, and possibly an internetwork (layer 3) header and possibly a transport (layer 4) header.

The physical (layer 1) header defines the electrical, mechanical and procedural mechanisms for proper capture of the Ethernet frame, but is not captured by a Media Access Controller.

The data-link header provides information for transmitting the packet over a particular physical link (i.e., a communication medium), such as a point-to-point link, Ethernet link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination end nodes. More specifically, the packet is generated in the source node by a software application assigned to the source port number. Then, the packet is forwarded to the destination node and directed to the software application assigned to the destination port number. The transport header also may include error-checking information (e.g., a checksum) and other data-flow control information. For instance, in connection-oriented transport protocols such as the Transmission Control Protocol (TCP), the transport header may store sequencing information that indicates the packet's relative position in a transmitted stream of packets.

As used herein, a packet flow is a stream of packets that is communicated from a source node to a destination node. Each packet in the flow satisfies a set of predetermined criteria, e.g., based on relevant fields of the packet's header. An intermediate network node may be configured to perform "flow-based" routing operations so as to route each packet in a packet flow in the same manner. The intermediate node typically receives packets in the flow and forwards the packets in accordance with predetermined routing information that is distributed in packets using a routing protocol, such as the Open Shortest Path First (OSPF) protocol. Because each packet in the flow is addressed to the same destination end node, the intermediate node need only perform one forwarding decision for the entire packet flow, e.g., based on the first packet received in the flow. Thereafter, the intermediate node forwards packets in the packet flow based on the flow's previously determined routing information (e.g., adjacency information). In this way, the intermediate node consumes fewer resources, such as processor and memory bandwidth and processing time, than if it performed a separate forwarding decision for every packet in the packet flow.

In practice, the intermediate network node identifies packets in a packet flow by a combination of information that acts as a signature for the packet flow. In this context, a signature is a set of values that remain constant for every packet in a packet flow. For example, assume each packet in a first packet flow stores the same pair of source and destination IP address values. In this case, a signature for the first packet flow may be generated based on the values of these source and destination IP addresses. Likewise, a different signature may be generated for a second packet flow whose packets store a different set of source and destination IP addresses than packets in the first packet flow. Of course, those skilled in the art will appreciate that a packet flow's signature information is not limited to IP addresses and may include other information, such as TCP port numbers, IP version numbers and so forth.

When a packet is received by the intermediate network node, signature information is extracted from the packet's network headers and used to associate the received packet with a packet flow. The packet is routed in accordance with that flow.

The intermediate network node typically receives a large number of packet flows from various sources, including end nodes and other intermediate nodes. Each source may be responsible for establishing one or more packet flows with the intermediate node. To optimize use of its processing bandwidth, the intermediate node may process the received flows on a prioritized basis. That is, as packets are received at the intermediate node, they are identified as belonging to, for example, a high or low priority packet flow. Packets in the high-priority flow may be processed by the intermediate node in advance of the low-priority packets, even if the low-priority packets were received before the high-priority packets.

According to embodiments of the invention described below, the intermediate network node 102 is configured to reduce the burden on a central processing unit in the routing of packet flows.

2.0 Structural Overview

A general purpose router which may serve as the network node 102 in some embodiments is described in greater detail in a later section with reference to FIG. 6. At this juncture, it is sufficient to note that the router 600 includes a general purpose processor 602 (i.e., a CPU), a main memory 604, and a switching system 630 connected to multiple network links 632. According to some embodiments of the invention, switching system 630 is modified as described in this section.

Figure 2A:
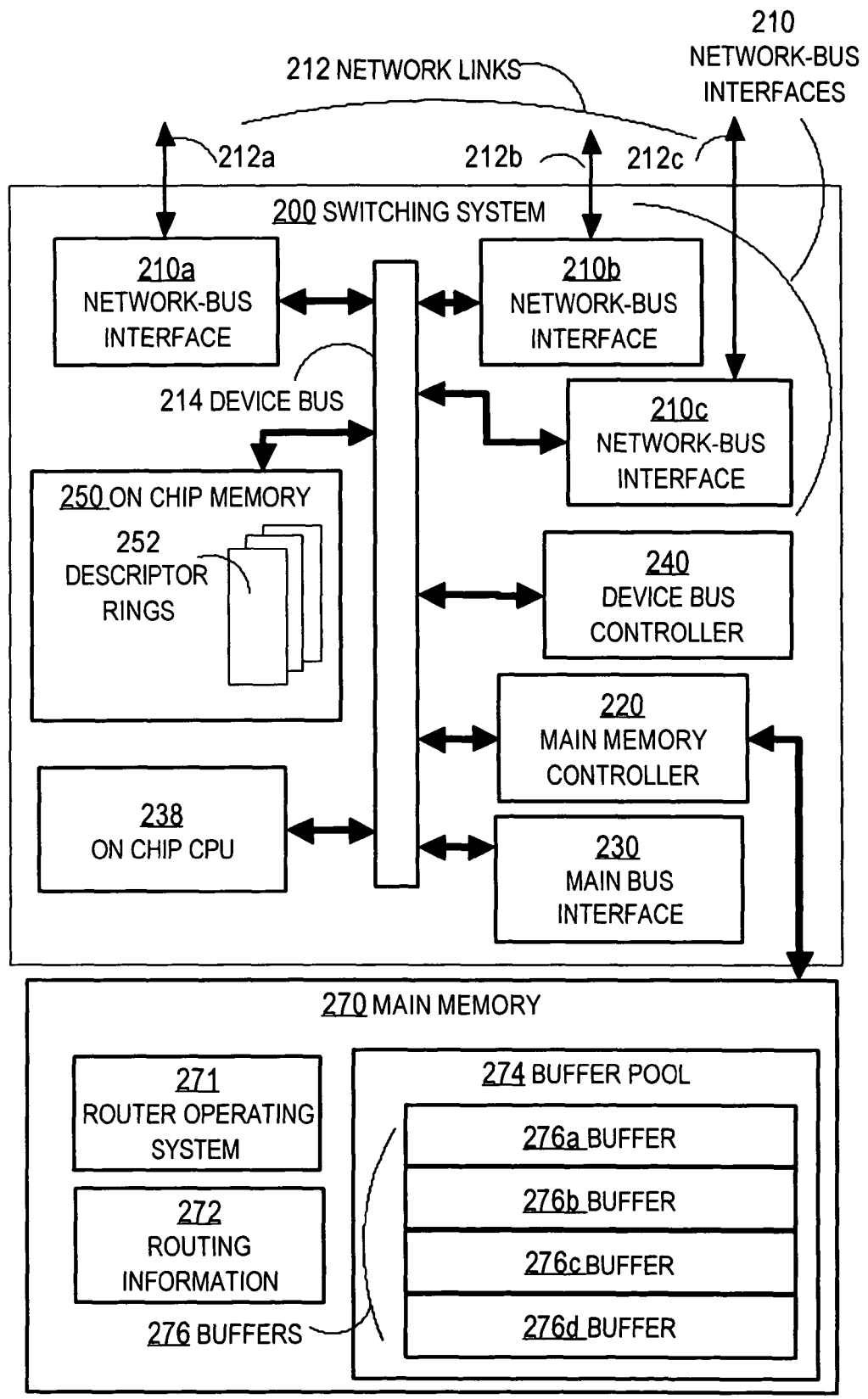
FIG. 2A is a block diagram that illustrates a switching system in a router that uses a main memory of the router, according to an embodiment.

FIG. 2A is a block diagram that illustrates a switching system 200 that uses a main memory 270 of a router (e.g., memory 604 of router 600) to control the routing of packets across network links 212 (e.g., 632), according to an embodiment. The switching system 200 includes a device bus 214, device bus controller 240, multiple network-bus interfaces 210, main bus interface 230, on-chip CPU 238, main memory controller 220 and on-chip memory 250.

The device bus 214 is a local bus for passing data between the components of switching system 200. In some embodiments, the device bus 214 is a fast device bus (FDB) that has greater bandwidth than a main bus used with main memory, such as bus 610 depicted in FIG. 6 and described in a later section.

Each network-bus interface 210, such as network-bus interfaces 210a, 210b, 210c, includes circuitry and logic to couple the device bus 214 to a network link 212, and is described in more detail below with reference to FIG. 2B.

The main bus interface 230 includes circuitry and logic to couple data on device bus 214 to a main bus (e.g., bus 610 in FIG. 6) and data on a main bus to the device bus 214. The memory controller 220 comprises circuitry and logic configured to store and retrieve data in main memory 270. In some embodiments, main memory controller 220 is connected directly to a main bus for transferring data to the main memory. In some embodiments, main memory controller sends data to main memory 270 by transferring data through main bus interface 230.

The on-chip CPU 238 is a general purpose processor that performs operations on data based on instructions received by the CPU 238, as described in more detail below for processor 602. In some embodiments, multiple on-chip CPUs are included. Although the illustrated on-chip CPU 238 is situated in the switching system 200, it is also expressly contemplated that the on-chip CPU may reside in a separate module coupled to the switching system 200, or the functions performed by the on-chip CPU 238 (or a portion thereof) may be performed by a separate CPU connected to the main bus (such as CPU 602 connected to main bus 610, described below). In some embodiments, on-chip CPU 238 is omitted.

The bus controller 240 comprises circuitry and logic that, among other operations, implements an arbitration policy for coordinating access to the device bus 214. That is, the controller 240 prevents two or more entities, such as the network-bus interfaces 210, memory controller 220, etc., from attempting to access the bus 214 at substantively the same time. To that end, the bus controller 240 may be configured to grant or deny access to the bus 214 based on a predefined arbitration protocol.

The on-chip memory 250 comprises a set of addressable memory locations resident on the switching system 200. The on-chip memory may be a form of volatile memory, such as static RAM (SRAM), or a form of erasable non-volatile memory, such as Flash memory. Although the illustrated on-chip memory 250 is situated in the switching system 200, it is also expressly contemplated that the on-chip memory may reside in a separate memory module coupled to the switching system 200, or the contents of the on-chip memory (or a portion thereof) may be incorporated into the main memory 270.

The on-chip memory 250 stores, among other things, one or more descriptor rings 252. As used herein, a ring is a circular first-in, first-out (FIFO) queue of records, where a record is a number of fields stored in a certain number of bytes. Each network interface in a network bus interface 210 is associated with at least one ring 252 in the on-chip memory 250.

The main memory 270 includes instructions from a router operating system 271, routing information 272, and a buffer pool 274. The buffer pool includes multiple buffers 276 of a certain size, e.g, buffers 276a, 276b, 276c, 276d, for storing data from one or more packets. In an illustrated embodiment, buffers 276 are each two thousand forty eight bytes (2 kilobytes, kB) in size; sufficient to hold an entire non-jumbo Ethernet (E/N) packet, which is always less than 1,518 bytes in size. Data from no more than one packet is held in any one buffer. Several buffers 276 are used to hold a jumbo E/N packet greater than 2 kB in size.

When a packet is received at a network interface, data from the packet is forwarded by the network-bus interface 210 using the main memory controller 220 to an available data buffer 276 in the main memory 270. The router operating system instructions 271 causes a memory reference (i.e., a "descriptor") to the data buffer to be inserted in a descriptor record which is enqueued in the descriptor ring 252 in on-chip memory 250 and associated with the network bus interface 210 that received the packet. Data from the packet is stored and descriptors are enqueued in this manner until the network bus interface 210 determines that an entire packet 130 has been received or an error has occurred. Accordingly, the network interface's descriptor ring 252 stores an ordered list of descriptor records corresponding to the order in which the data in a packet is received at the interface of a network-bus interface.

Figure 2B:
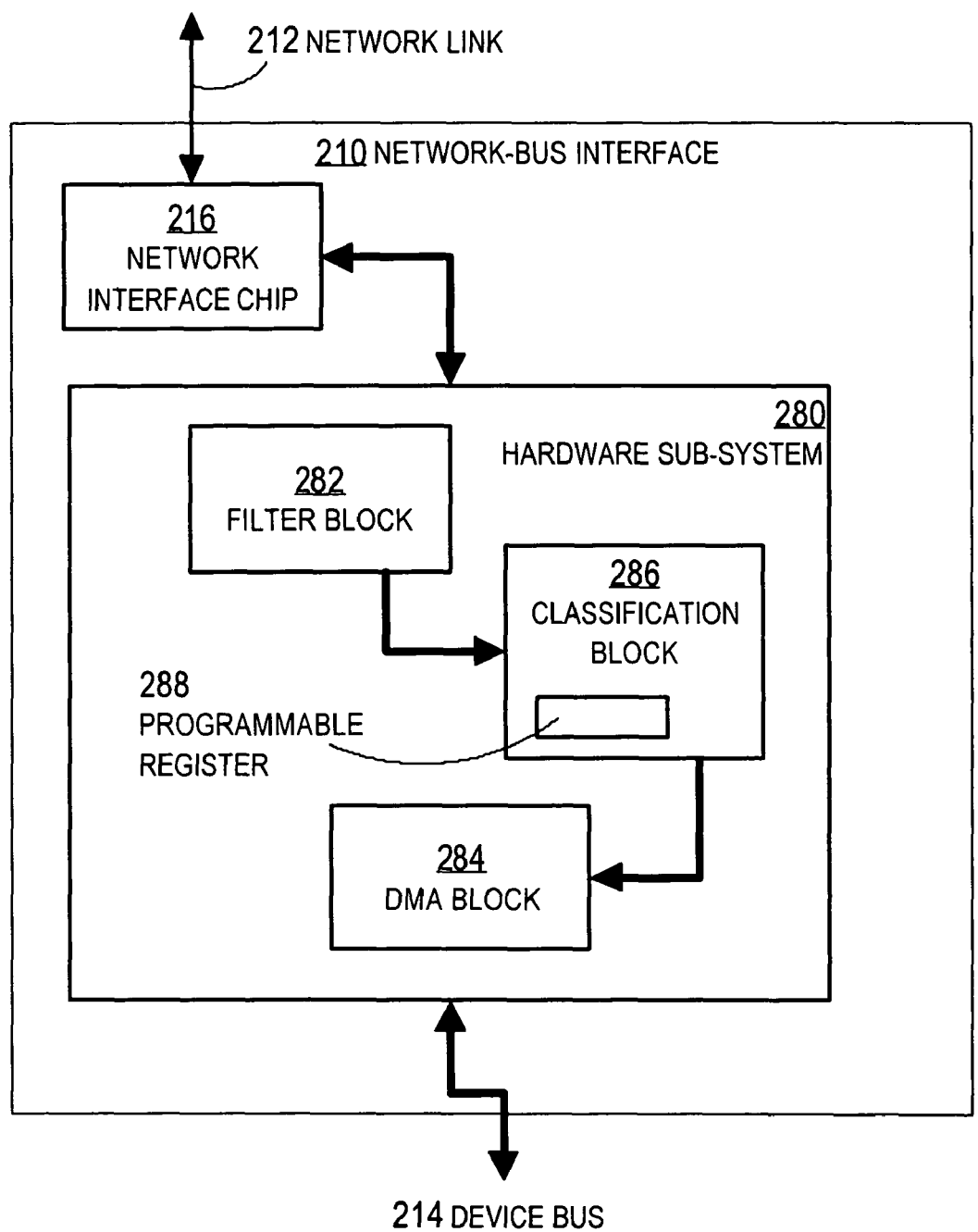
FIG. 2B is a block diagram that illustrates a network-bus interface in the switching system of FIG. 2A, according to an embodiment.

FIG. 2B is a block diagram that illustrates a network-bus interface 210, according to an embodiment. The network-bus interface 210 includes a network interface chip 216 connected to network link 212 and a hardware sub-system 280 connecting the device bus 214 to the network interface chip 216. Sub-system 280 includes circuitry and logic configured to send and receive data over a bus coupled to a network interface chip 216. Data received at a network interface chip 216 is forwarded over a bus to sub-system 280, which frames the received data so it may be transferred over the device bus 214. Conversely, the subsystem 280 may receive data from the device bus 214 and reformat the data for transmission over the bus to network interface chip 216. The network interface chip 216 may use any bus known in the art at the time the interface 210 is implemented, to exchange data with hardware sub-system 280, including the IEEE 802.3u clause 22.4 Media Independent Interface (MII). Additionally, the Network-Bus Interface subsystem (block) 210 can be an external chip where any bus known in the art at the time the interface 210 is implemented, to exchange data with the hardware subsystem 280 such as peripheral component interconnect (PCI) buses, Industry Standard Architecture (ISA) buses, Extended ISA (EISA) buses, among others.

In some embodiments, an integrated circuit chip includes the fast device bus 214 and all components connected to fast device bus 214, including a hardware subsystem 280 on each network-bus interface 210, and including device bus controller 240, main memory controller 220, on-chip memory 250 and on-chip CPU 238. Network interface chips 216 in the network-bus interfaces 210 are separate chips on a circuit board assembled to implement a router. Other components of a router, such as main memory, are provided as one or more additional chips on a circuit board to implement the router.

In the illustrated embodiment, the hardware sub-system 280 in network-bus interface 210 includes a filter block 282, a direct memory access (DMA) block 284, and a classification block 286. Filter block 282 includes circuitry and logic to separate higher priority packets from lower priority packets, including packets that are dropped from further processing for any reason. In some embodiments block 282 is omitted. DMA block 284 includes circuitry and logic to store and access data in the on chip memory 250, such as descriptor records in descriptor rings 252, 254 and main memory 270, such as packet data.

Classification block 286 includes circuitry and logic to determine the types of protocols used in the packet, as described in greater detail below. To accommodate protocol types that are not defined at the time the classification block is implemented, the classification block includes a programmable register 288 that can be set by a CPU executing one or more instructions included in router operating system 271, as described in greater detail below.

Figure 2C:
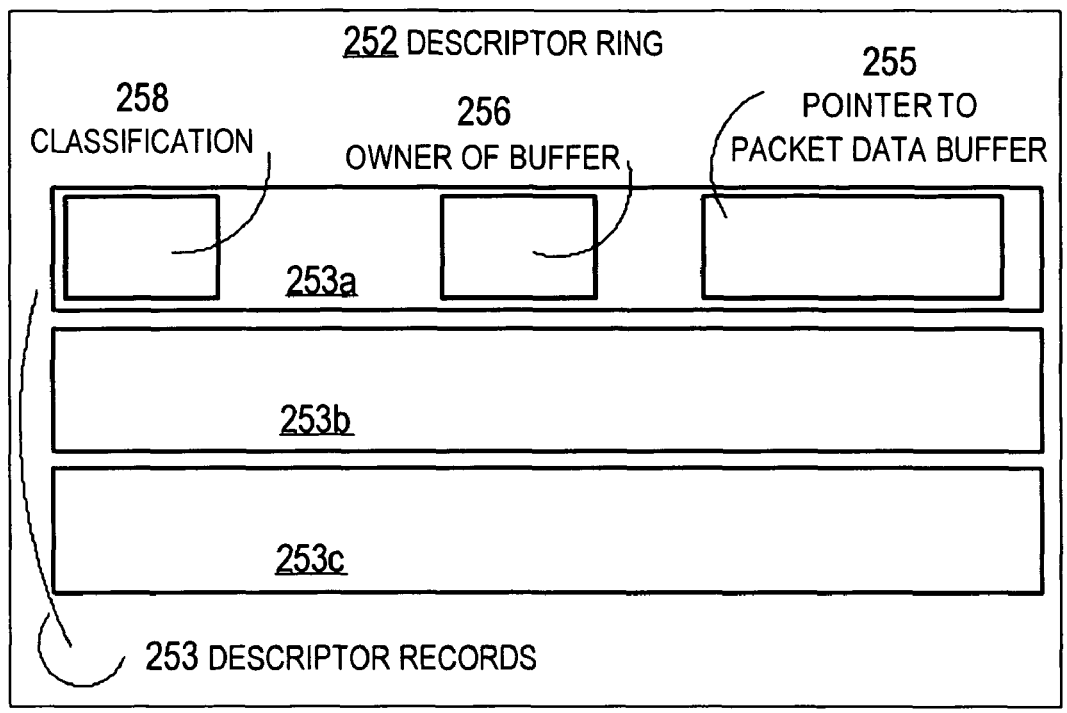
FIG. 2C is a block diagram that illustrates a descriptor record in a descriptor ring in switching system memory, according to an embodiment.

FIG. 2C is a block diagram that illustrates descriptor records 253, including records 253a, 253b, 253c, in a descriptor ring 252 in switching system memory, according to an embodiment. In the illustrated embodiment, descriptor records 253, e.g., record 253a, includes not only a pointer field 255 and an owner field 256 for the data from the packet, but also a classification field 258 based on the protocols used by the packet. The pointer field 255 holds data that indicates the location of a data buffer 276 where the first arriving data from the packet is stored, e.g., 276b. The owner field 256 holds data that indicates whether the CPU or the network bus interface 210 or some other component has ownership of the descriptor record 253 and the associated data buffer, e.g., buffer 276b. In an illustrated embodiment described in more detail below, the classification field 258 is a 5 bit portion of descriptor record 253, e.g., record 253a.

Figure 2D:
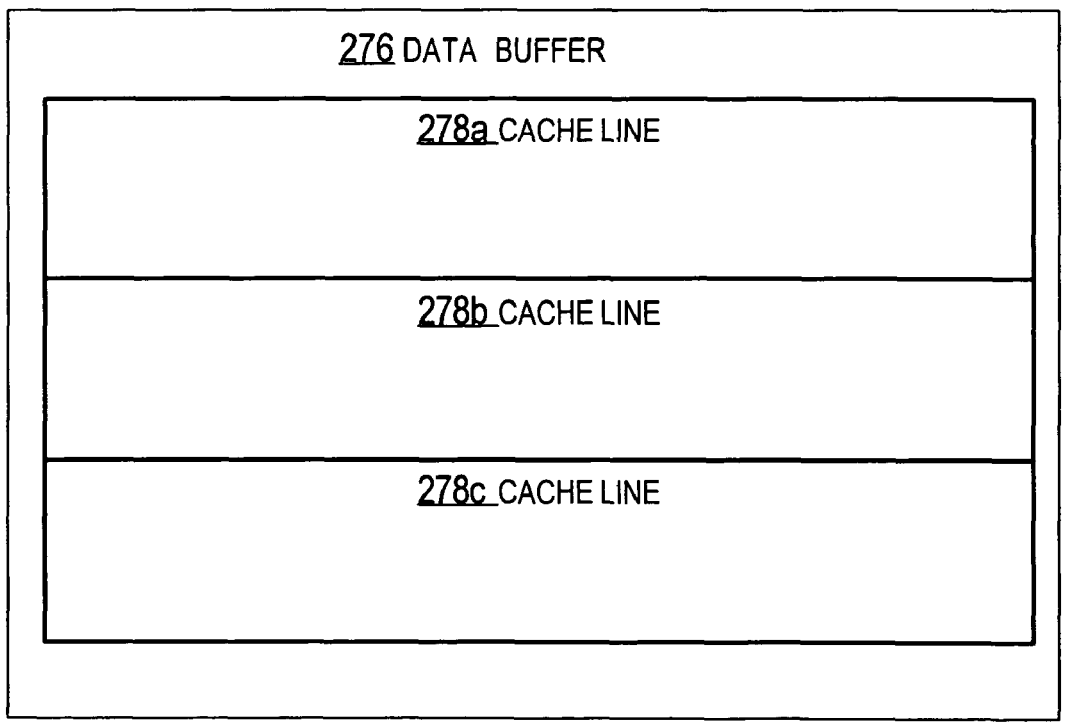
FIG. 2D is a block diagram that illustrates processor cache line in a packet buffer in main memory, according to an embodiment.

A CPU stores data for processing in an element called a CPU data cache. The CPU is configured to exchange data between the CPU data cache and main memory 270 in a group of bits called a cache line. For purposes of illustration it is assumed that one cache line is 32 bytes, where one byte is equal to eight bits. Blocks of 32 bytes in main memory are efficiently addressed and retrieved or loaded by the CPU for use in processing that is performed by the CPU. FIG. 2D is a block diagram that illustrates processor cache lines in a packet buffer in main memory, according to an embodiment. As shown in FIG. 2D, each data buffer 276 for storing data from a packet includes a portion of main memory that is addressed and exchanged with the CPU in multiple cache lines, including cache lines 278a, 278b, 278c and others, not shown, collectively referenced hereinafter as cache lines 278.

For example, when the CPU needs to retrieve data within cache line 278b of buffer 276, the entire cache line 278b is moved from main memory 270 into the CPU data cache. In an illustrated embodiment, the 32 byte cache line is transferred using a burst of eight bytes per bus clock cycle for 5 successive bus clock cycles. The first clock cycle transfers 8 bytes that include data indicating a location in memory where the data is stored. The next four clock cycles each transfer 8 bytes of the 32 bytes starting at that location in memory. If the CPU makes a change in the data in its data cache which should be recorded in main memory, then the data in the CPU data cache is moved to cache line 278b in another 5 bus clock cycles before another cache line is moved from memory into the same location in the data cache of the CPU.

Depending on the protocols used by a packet 130, the first protocol header may occupy a different amount of the space in data buffer 276. Consequently, the beginning of header 142 of the second protocol may be found in any of several cache lines 278 in data buffer 276. As a further consequence, the end of the header 142 may be found in the same or a subsequent cache line 278. To process the data in the second header in making a routing decision, the CPU may have to retrieve data in multiple cache lines, consuming a corresponding multiple of 5 bus clock cycles to retrieve the data, in addition to any CPU clock cycles consumed to process the data once retrieved.

For example, in a packet formatted according to the ARPA E/N protocol, with a payload formatted according to IP using a minimum header length of 20 bytes, the header for the IP protocol begins on the 15th byte of the packet E/N and ends on the 35th byte. Therefore the header for the IP protocol begins away from the boundaries within a first cache line (e.g., 278a extending from the first byte to the $32^{nd}$ byte) and ends away from the boundaries within the second cache line (e.g., 278b extending from the $33^{rd}$ byte to the $64^{th}$ byte).

3.0 Functional Overview

According to embodiments of the invention, the hardware sub-system 280 determines types of protocols used in the packet 130 to classify the packet In some embodiments, the hardware sub-system 280 also shifts the packet, based on the classification, so that the header 142 of the second protocol is at a known position within one cache line 278 in data buffer 276. In an illustrated embodiment, the sub-system 280 pads the data stream sent to memory controller 220 so that the beginning of header 142 for the second protocol is aligned with the beginning of the second cache line 278b in data buffer 276.

In an example of the illustrated embodiment, in which the packet is an ARPA E/N packet using IP, sub-system 280 pads the data sent to memory controller 220 with 18 bytes. This padding has the effect of shifting the location of the data from the packet in data buffer 276 by 18 bytes. As a consequence, the IP header begins at the $33^{rd}$ byte from the beginning of the data buffer which aligns with the beginning of cache line 278b. Similarly, the minimum IP header ends at the $53^{rd}$ byte from the beginning of the data buffer, within the second cache line 278b. As a consequence, the CPU can route the packet based on information in the IP header by retrieving only one cache line, e.g., cache line 278b. Thus the 5 bus clock cycles to read in cache line 278a and 5 bus clock cycles to read in cache line 278c are saved. Since the CPU can rely on the IP header beginning on the boundary of cache line 278b, additional CPU clock cycles to find the IP header in the cache line 278b are also saved. Based upon experiments with an embodiment of the invention, about 10% reduction in CPU clock cycle consumption is observed, with a corresponding improvement in router speed by about 10% when limited feature processing is enabled.

FIG. 3 is a flow diagram that illustrates a method 300 for processing a packet in the CPU of a router, e.g., in on-chip CPU 238 or processor 602, according to an embodiment. Although steps are shown in a particular order in FIG. 3 and subsequent flow diagrams for purposes of illustration, in other embodiments one or more steps may be performed in a different order or overlapping in time or may be omitted.

In step 302, an offset is associated with each classification for the protocols used by a packet The offset is used by the sub-system 280 to align the header 142 of a second protocol relative to a cache line boundary. For example, in step 302, an offset of 18 bytes is associated with a classification that indicates an ARPA E/N protocol with an IP payload. The classification indicates at least two protocols used by the packet. In an illustrated embodiment, the classification indicates the layer 2 and subsequent layer protocol (e.g., layer 2.5 or layer 3 protocols). In other embodiments, the classification indicates more than two layers of protocols. Additional details on the classifications used are described in a later section.

In step 310, the CPU indicates a buffer that is free for storing data from the next packet received at a particular network-bus interface. In an illustrated embodiment, the CPU writes, to a descriptor record 253, data that references a buffer 276 in main memory 270 indicated by pointer field 255. The CPU indicates that the referenced buffer is available for storing data from a packet received at network-bus interface 210a. The CPU writes to the owner field 256 data that indicates the particular network-bus interface that may use the data buffer. For example, during step 310, a CPU initializes a descriptor ring 252 for each network-bus interface 210, e.g., network-bus interface 210a, by writing several descriptor records each pointing to a different buffer 276 in buffer pool 274 and sets the contents of owner field 256 of each descriptor record to data that indicates the associated network-bus interface 210, e.g., network-bus interface 210a.

In another example, on-chip CPU 238 finishes processing the data in data buffer 276d so that the buffer 276d is available for storing data from a packet received from network-bus interface 210b. The CPU finds, in a descriptor ring 252 associated with network-bus interface 210b, a certain descriptor record 253, e.g., 253c that includes a pointer field 255 with data pointing to data buffer 276d. The CPU changes the contents of the owner field 256 to indicate that network-bus interface 210b, rather than the CPU, now owns that certain descriptor record 253c and the associated data buffer 276d.

In some embodiments, step 310 includes forming a different descriptor ring for each classification code. In such embodiments, all the packets pointed to by one descriptor ring use the same combination of first and second protocols. Therefore, only instructions that deal with that ore combination of protocols need be loaded into the CPU for processing the packets stored in the data buffers referenced by that descriptor ring. An advantage of such embodiments is that fewer instructions need to be swapped into a CPU instruction cache (i-cache) from the router operating system 271 in main memory. This reduces clock cycles devoted to retrieving and purging instructions that are not used to process those packets. A further advantage is obtained in switching systems with multiple on-chip CPUs like CPU 238. Then each CPU may be assigned to process packets associated with one descriptor ring and one associated combination of protocols. The operating system 271 may include a group of software routines, one routine for each unique protocol combination as indicated by a classification code. A single CPU just loads the specific routines associated with the classification code and processes the data on a descriptor ring associated with the same classification code. By instantiating a separate descriptor ring for each data type, significant efficiencies can be achieved, such as: using a constant offset for aligning data fields; using constant values for other parameters; using a reduced number of instructions to process packets on a given descriptor ring because different packet types do not have to be processed; saving the resources to swap processing instructions into and out of the i-cache on the router CPU; and optimizing for multiple CPUs by insuring that a given CPU will only process packets of a specific set of packet types, requiring fewer instructions per processor and subsequently fewer cache line ejections resulting in fewer memory transactions.

In step 312, the CPU enables and configures a network-bus interface 210. In some embodiments, step 312 is performed before step 310. During step 312, the network-bus interface is configured to use a particular descriptor ring or rings located in on-chip memory 250 or main memory 270. According to some embodiments of the invention, step 312 includes setting programmable register 288 to indicate a code for a protocol type or combination developed after the classification block 286 was designed and implemented. This later-developed protocol is called a "special" protocol hereinafter. In some embodiments, more than one special protocol is indicated by values input into programmable register 288.

For example, it is assumed for purposes of illustration that a point-to-point protocol (PPP) over Ethernet (PPPOE) is developed after the classification block 286 is implemented. It is further assumed for purposes of illustration that the PPPOE code is indicated by a hexadecimal value of 8864 in a type field of the type fields 136 in a first protocol header 132 of a packet 130. Hexadecimal values, well known in the art of digital circuits and programming, are designated herein by a leading 0x or a leading h. Thus, in this example, during step 312, the programmable register 288 is set to include a value of 0x8864 (also designated h8864).

In step 320, the CPU waits for a hardware interrupt signal from a network-bus interface 210. In many embodiments, the CPU performs one or more other functions while waiting for the interrupt signal. For example, the CPU processes data from a previously received packet.

In step 330 a hardware interrupt signal is received from a network-bus interface, e.g., from network-bus interface 210b. Based on the interrupt signal, the CPU determines the descriptor ring associated with network-bus interface 210b. Any method may be used to find the appropriate descriptor ring. In an illustrated embodiment, the CPU reads an interrupt status register that indicates the descriptor ring which has been updated by the network-bus interface.

In step 340, the CPU finds the last descriptor record updated by the network-bus interface. Any method may be used to find the last descriptor record. In an illustrated embodiment, the CPU reads a tail pointer associated with the descriptor ring. The tail pointer indicates the last descriptor record associated with a data buffer where an associated network-bus interface may have written a new data packet. The CPU retrieves the data in the pointer field 255 in the descriptor record indicated by the tail pointer to find the descriptor record that has just been used for a new packet; and the CPU thus obtains the pointer to the data buffer in main memory where the data from the recently received packet is stored. The CPU also increments the tail pointer to indicate the next descriptor record to be used by the CPU 238 to read data from a packet For example, based on the tail pointer, the CPU reads the pointer field 255 in the descriptor record 253c indicated by the tail pointer and determines that the data from the most recently received packet at network-bus interface 210b is stored in data buffer 276b in main memory 270.

According to various embodiments of the invention, during step 340, the CPU reads the classification field 258 to obtain classification data (e.g., a classification code) that indicates the protocols used by packet 130 that are of significance for routing the packet 130. The classification code in classification field 258 is determined by the classification block 286 of network-bus interface 210, as described in more detail below.

For example, based on the classification code in classification field 258, the CPU determines that the most recently received packet is an ARPA IP packet. In embodiments using different descriptor rings for different classification types, the CPU determines classification data (e.g., a classification code) based on the descriptor ring indicated in the interrupt received.

In step 350, the CPU determines the cache line to retrieve to obtain the IP header data for use in routing the packet and retrieves that cache line. For example, based on the classification code that indicates the packet is an ARPA IP packet, the CPU determines that the IP header is aligned to begin in the second cache line 278b of data buffer 276b. The IP header is aligned by the network-bus interface 210 as described in more detail below. The CPU then issues a command to read the second cache line 278b of data buffer 276b, consuming a bus clock cycle to issue the retrieve command, and five bus clock cycles to receive the cache line into cache memory on the CPU.

In embodiments without classification field 258 or a descriptor ring associated with a certain classification step 350 includes many additional steps, not shown, in which the CPU determines the protocols of significance for routing the packet 130 by reading the data in the data buffer 276. For example, the CPU retrieves several cache lines, e.g., cache lines 278a, 278b, 278c, from data buffer 276b and determines that the data in buffer 276b is formatted according to an ARPA IP packet In an example of such an embodiment, these additional steps involve 15 clock cycles to retrieve cache lines 278a, 278b, 278c and additional clock cycles to determine that the data in cache lines 278a, 278b, 278c indicate an ARPA IP packet Consequently, the CPU determines that the IP header begins in the $15^{th}$ byte in cache line 278a, and ends in the $3^{rd}$ byte of the second cache line 278b. Because the packet was recently received from the network interface, the cache lines are not resident in the memory cache on the CPU, the CPU then consumes further additional clock cycles to retrieve the missing cache lines 278a or 278b of data buffer 276b.

In step 360, the first bytes of the received cache line are interpreted as the header 142 for the second protocol. For example, the first 20 bytes of the retrieved cache line 278b are interpreted as the IP header. Consequently, in this example, the IP source address is indicated by data in the $9^{th}$ through $12^{th}$ bytes, and the IP destination address is indicated by data in the $13^{th}$ through $16^{th}$ bytes. In other embodiments, the second header is aligned by the network-bus interface at a different known location in a cache line, for example in the $13^{th}$ through $32^{nd}$ byte of the cache line instead of the first through $20^{th}$ byte of the cache line.

In embodiments in which the network-bus interface 210 does not align the second protocol on the cache line boundary, the first bytes of the received cache can not reliably be used as the header of the second protocol, and step 360 is replaced by a more arduous step to find the header of the second protocol in one or more cache lines.

In step 370, the packet 130 is routed based on data in the header for the second protocol. For example, based on the IP source and IP destination addresses, a packet flow signature is derived, the packet is associated with a particular packet flow having that signature, and the packet 130 is routed according to the data links determined for that particular packet flow.

FIG. 4 is a flow diagram that illustrates a method for processing a packet in the network-bus interface 210 of FIG. 2B, according to an embodiment. In an illustrated embodiment, at least some steps of FIG. 4 are performed by the classification block 286 in the network-bus interface 210.

During step 410, the network-bus interface 210 reads the descriptor record to determine the data buffer location where data from the next received packet is to be stored. Any method may be used to find the next descriptor record. In an illustrated embodiment, the network bus reads a head pointer associated with the descriptor ring. The head pointer indicates the next descriptor record where an associated network-bus interface finds a data buffer for a new packet. It is assumed for purposes of illustration that the head pointer indicates descriptor record 253a in which the pointer field 255 indicates data buffer 276d.

During step 412, the classification block reads the contents of the programmable register 288 to determine a value that indicates a new protocol in a type field of the header of the first protocol. For example, based on the contents of register 288 being equal to 0x8864, the classification block 286 determines that a special protocol type is indicated if a value of 0x8864 is found in one or more of the type fields 136 in first protocol header 132.

In step 420, the network-bus interface 210 receives bytes for a packet, such as packet 130, and the classification block 286 classifies the packet based on the type of the first protocol and the second protocol. Based on the types, a classification code is written to memory for use by the CPU or a particular descriptor ring associated with the types is selected. In an illustrated embodiment, the classification code is a 5 bit code written to the classification field 258 in the descriptor record 253 associated with the data buffer 276d where the data from the packet is to be stored. For example, the classification block 286 examines the bytes in the type fields 136 of the packet 130 to determine the types of the first protocol and the second protocol, and a 5 bit classification code that indicates the types of the first and second protocols is written to the classification field 258. An illustrated embodiment that handles a variety of protocol type combinations is described in detail in a later section. It is assumed here, for purposes of illustration that the $13^{th}$ and $14^{th}$ bytes contain the value 0x0800, which indicates an ARPA packet in which the next protocol is IP. It is further assumed that the classification code associated with these two protocols is "2" in decimal and is indicated by the 5 bits 00010. The five bits 00010 are written to the classification field 258.

In step 430, the network-bus interface receives data indicating an offset associated with the classification code. Any method may be used to receive this data. The data may reside in the on-chip memory 250 in a fixed known location. The location for the data in the on-chip memory may be stored by the CPU in a second programmable register (not shown) in hardware sub-system 280, such as in DMA block 284.

For example, a CPU programmable table of data associating classification codes with offset values is created using a group of nineteen 5-bit registers and a 19-to-1 five-bit multiplexer. In other embodiments more or fewer than 19 registers are used with a multiplexer of corresponding size. The CPU programs the first table entry with the 5-bit offset for classification code 0. Subsequently, the CPU will program the 2nd table entry with the offset for classification code 1 and so on. The size of the table is 19 entries of 5-bits corresponding to the 19 classifications. The 19-to-1 5-bit multiplexer takes the nineteen 5-bit register values as inputs and a 5-bit selection which is driven by the 5-bit classification code. The output of the 19-to-1 multiplexer is the desired 5-bit offset for the identified classification code.

In step 440, the data from the packet is padded by a number of bytes equal to the offset value so that the packet is shifted in the data buffer 276 by the offset amount. For example, 18 bytes of zeroes (0x00) are padded to the beginning of the packet as data is moved by DMA block 284 into main memory data buffer 276d through memory controller 220. As a result of this shift, the IP header starting in the $15^{th}$ byte of the packet begins in the $33^{rd}$ byte of data buffer 276d. This places the IP header at the start of the second cache line 278b in the data buffer, as expected by the CPU and explained above with reference to step 360. The rest of the packet in placed into the remainder of the data buffer 276d. For a jumbo packet, multiple data buffers 276 are used to store the rest of the data.

In step 450, the owner of the data buffer is changed to the CPU, so that the CPU can process the data in the data buffer. For example, the data in the owner field 256 of the descriptor 253a is changed to indicate that a CPU, e.g., on-chip CPU 238, owns the descriptor record 253a and the associated data buffer 276d.

In step 460, a hardware interrupt is set to the CPU, e.g., on-chip CPU 238. In some embodiments step 460 includes setting an interrupt status register to indicate the descriptor ring where the packet descriptor record is stored. The CPU begins processing the data buffer 276d as described above in FIG. 3, beginning at step 330.

In step 470, the head pointer is incremented so that the network-bus interface looks for the next available record at the appropriate descriptor record 253, e.g., 253b.

4.0 Example with Data Link Protocol Types

To further illustrate embodiments of the invention, an example embodiment is described in which the first protocol is an Ethernet data link (layer 2) protocol and the second protocol included in the payload of the first protocol is a following layer (such as layer 2.5 or layer 3). In other embodiments, different layers of protocols are used as the first protocol or the second protocol or both. In some embodiments, more than two protocols or more than two layers of protocols or non successive protocols are combined to classify a packet.

FIG. 5A and FIG. 5B constitute a table that illustrates contents of type fields in the headers for a variety of Ethernet layer 2 protocols for classification, according to an embodiment. The table includes label row 580 and information rows 501 through 519. The table also includes columns 522, 524, 5226, 528, 530, 532, 534, 536, 538, 540. Each data row represents a unique combination of a layer 2 and a subsequent layer (layer 2.5 or layer 3) protocol. As indicated by the label row 580, the first column indicates a classification that represents a unique combination of protocols. The next columns indicate the contents of byte pair positions in the packet. In the illustrated embodiment, bytes 13, 14 constitute at least part of type fields 136 in packet 130. For different combinations of protocols, other byte pairs may also be included in the type fields 136. The contents of a byte pair are expressed as a four digit hexadecimal value; to save space in this table, a hexadecimal value is designated in this table with an "h" prefix.

As indicated by the table in FIGS. 5A and 5B, nineteen different classifications, representing unique combinations of protocols are considered in the illustrated embodiment. The nineteen classifications are indicated by the contents of the byte pairs in the column 524 and following columns. In other embodiments more or fewer classifications are used.

Row 502 shows that a packet formatted according to the ARPA protocol with IP formatting in the ARPA payload (designated by ARPA_IP in column 522) is indicated by 0x0800 or 0x86DD in bytes 13 to 14 (column 524). The contents of the following bytes are not relevant to determine this data type; and in fact the following bytes constitute part of the IP header in the payload of the ARPA protocol. Similarly, row 501 shows that an ARPA packet with MPLS protocol in the payload (designated by ARPA_MPLS in column 522) is indicated by an 0x8847 or 0x8848 in bytes 13 to 14 (column 524). Row 503 shows that an ARPA packet with a later developed (i.e., special) protocol in the payload (designated by ARPA_SPECIAL in column 522) is indicated by an arbitrary value (designated 0xXXXX) in bytes 13 to 14 (column 524). The arbitrary value is stored in programmable register 288. For example, if the special protocol is a PPPOE protocol, then the arbitrary value is 0x8864, as stored in register 288 and described above.

For SNAP (shown in rows 504, 505, 506), the contents of bytes 13 to 14 are less than 0x0600, which indicates a size of the Ethernet payload, or is 0x8870, and the contents of bytes 15 to 16 (column 526) are 0xAAAA. The second protocol is determined based on the contents of bytes 21 to 22 (column 532). The second protocol is MPLS if the contents of bytes 21 to 22 are 0x8847 or 0x8848 as shown in row 504; the second protocol is IP if the contents of bytes 21 to 22 are 0x0800 or 0x86DD as shown in row 505; and the second protocol is special as shown in row 506, if the contents of bytes 21 to 22 are one of the special values in register 288 represented by 0xXXXX, such as 0x8864 for PPPOE.

For VLAN (shown in rows 507, 508, 509), the contents of bytes 13 to 14 are 0x8100. The second protocol is determined based on the contents of bytes 17 to 18 (column 528). The second protocol is MPLS if the contents of bytes 17 to 18 are 0x8847 or 0x8848 as shown in row 507; the second protocol is IP if the contents of bytes 17 to 18 are 0x0800 or 0x86DD as shown in row 508; and the second protocol is special, as shown in row 509, if the contents of bytes 17 to 18 are one of the special values in register 288 represented by 0xXXXX, such as 0x8864 for PPPOE.

For a layer 2 protocol that combines VLAN and SNAP (shown in rows 510, 511, 512), the contents of bytes 13 to 14 are 0x8100, as in VLAN. Furthermore, parallel to the byte contents for SNAP, the contents of bytes 17 to 18 (column 528) are less than 0x0600 or are 0x8870, and the contents of bytes 19 to 20 (column 530) are 0xAAAA. The second protocol is determined based on the contents of bytes 25 to 26 (column 536). The second protocol is MPLS if the contents of bytes 25 to 26 are 0x8847 or 0x8848 as shown in row 510; the second protocol is IP if the contents of bytes 25 to 26 are 0x0800 or 0x86DD as shown in row 511; and the second protocol is special, as shown in row 512, if the contents of bytes 25 to 26 are one of the special values represented by 0xXXXX, such as 0x8864 for PPPOE.

For QINQ (shown in rows 513, 514, 515), the contents of bytes 13 to 14 are 0x8100 or 0x9100 and the contents of bytes 17 to 18 (column 528) are 0x8100. The second protocol is determined based on the contents of bytes 21 to 22 (column 532). The second protocol is MPLS if the contents of bytes 21 to 22 are 0x8847 or 0x8848 as shown in row 513; the second protocol is IP if the contents of bytes 21 to 22 are 0x0800 or 0x86DD as shown in row 514; and the second protocol is special, as shown in row 515, if the contents of bytes 21 to 22 are one of the special values in register 288 represented by 0xXXXX, such as 0x8864 for PPPOE.

For a layer 2 protocol that combines QINQ and SNAP (shown in rows 516, 517, 518), the contents of bytes 13 to 14 are 0x8100 and the contents of bytes 17 to 18 (column 528) are 0x8100, as in QINQ. Furthermore, parallel to the byte contents for SNAP, the contents of bytes 21 to 22 (column 532) are less than 0x0600 or are 0x8870, and the contents of bytes 23 to 24 (column 534) are 0xAAAA. The second protocol is determined based on the contents of bytes 29 to 30 (column 540). The second protocol is MPLS if the contents of bytes 29 to 30 are 0x8847 or 0x8848 as shown in row 516; the second protocol is IP if the contents of bytes 29 to 30 are 0x0800 or 0x86DD as shown in row 517; and the second protocol is special, as shown in row 518, if the contents of bytes 29 to 30 are one of the special values in register 288 represented by 0xXXXX, such as 0x8864 for PPPOE.

If none of the above byte contents are found, the packet protocol combination is classified as OTHER, shown in row 519.

The implementation of the classification function represented by FIGS. 5A and 5B can be done using a combinatorial logic function which takes as inputs, bytes 13 thru 26 and bytes 29 and 30 of the header as well as the SPECIAL value in the programmable register 288. The output of the logic function is a 5-bit classification code. The combinatorial logic function checks for each case or row of the table resulting in 19 separate comparisons. For example, comparing the values of bytes 13:14 to h8847 or h8848 will result in a code of 0x00 representing an ARPA_MPLS classification. Priority encoding the function will prevent incorrect results if the SPECIAL register value conflicts with any non-special classifications. To priority encode the table, the true comparison associated with the lowest row in the table overrides any subsequent true comparisons. For example, if SPECIAL is programmed with h86DD and an E/N SNAP IP packet in a Jumbo frame is received, both row 505 (SNAP_IP) and row 506 (SNAP_SPECIAL) would match. The priority encoding would insure that the lowest row in the table which results in a true comparison, 505 or SNAP_IP and not 506 SNAP_SPECIAL is the resulting classification. Those skilled in the art will recognize that other implementation of this table are possible including the use of Finite State Machines and sequential logic and even a software programmable approach.

5.0 Computer Hardware Overview

Figure 6:
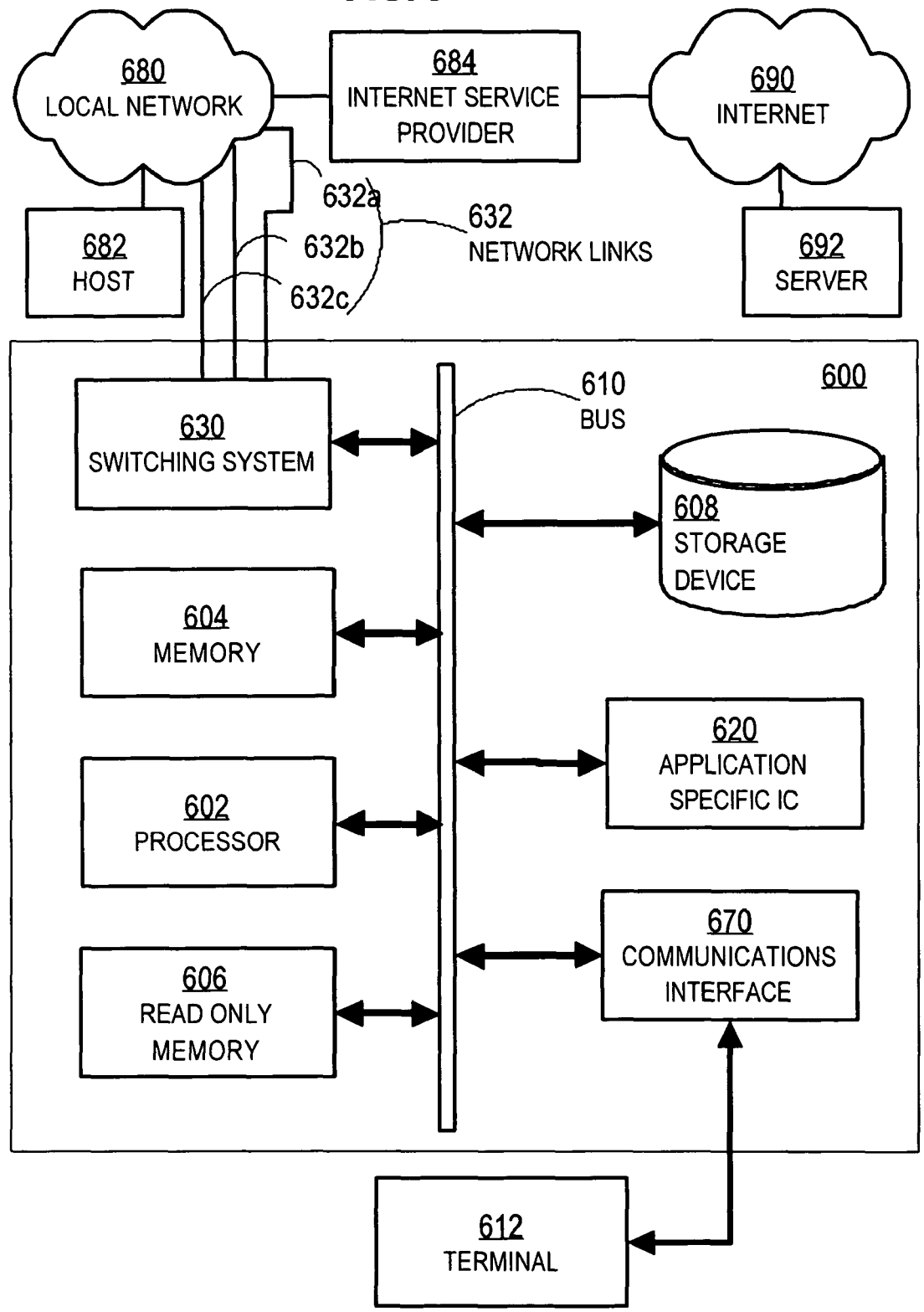
FIG. 6 is a block diagram that illustrates a general purpose router upon which an embodiment of the invention may be implemented.

FIG. 6 is a block diagram that illustrates a computer system 600 upon which an embodiment of the invention may be implemented. The preferred embodiment is implemented using one or more computer programs running on a router device; thus, in this embodiment, the computer system 600 is a router.

Computer system 600 includes a communication mechanism such as a bus 610 (or bus 214 in FIG. 2A) for passing information between other internal and external components of the computer system 600. Information is represented as physical signals of a measurable phenomenon, typically electric voltages, but including, in other embodiments, such phenomena as magnetic, electromagnetic, pressure, chemical, molecular, atomic and quantum interactions. For example, north and south magnetic fields, or a zero and non zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 (and CPU 238 in FIG. 2A) performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604 (an memory 250, 270 in FIG.

2A), such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a nonvolatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, and fiber optic cables. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620 and switching system 630, is coupled to bus 610. The special purpose hardware is configured to perform operations not performed by processor 602 quickly enough for special purposes. Examples of application specific ICs include graphics accelerator cards for generating images for display, switching system 630, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 200 in FIG. 2A, is an embodiment of switching system 630. Switching system 630 typically includes multiple communications interfaces, such as communications interface 670, for coupling to multiple other devices. In general, each coupling is with a network link 632 (such as network links 210 in FIG. 2A) that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to a network provides service in response to information received over a network. In the illustrated example, server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, as depicted in FIG. 2A, switching system 630 includes its own processor 238 and memory 250 to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632*a* using information in memory 604 (270 in FIG. 2A) and send it to the correct destination using output interface on link 632*c*. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 or switching system 630 executing one or more sequences of one or more instructions contained in memory, such as memory 604. Such instructions, also called software and program code, may be read into memory, such as memory 604, from another computer-readable medium such as storage device 608. Execution of the sequences of instructions contained in memory causes processor 602 or switching system 630 or both to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software unless otherwise explicitly stated.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632*b* through communications interface in switching system 630. The received code may be executed by processor 602 or switching system 630 as it is received, or may be stored in storage device 608 or other non volatile storage for later execution, or both. In this manner, computer system 600 may obtain application program code in the form of a carrier wave.

Various forms of computer readable media may be involved in carrying one or more sequence of instructions or data or both to processor 602 or switching system 630 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632*b*. An infrared detector serving as communications interface 670 receives the instructions and data carried in the infrared signal and places information representing the instructions and data onto bus 610. Bus 610 carries the information to memory 604 from which processor 602 or switching system 630 retrieves and executes the instructions using some of the data sent with the instructions. The instructions and data received in memory 604 may optionally be stored on storage device 608, or switching system 630 either before or after execution by the processor 602 or switching system 630.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for routing information in a payload of a first network protocol, which payload includes a second network protocol, comprising:
   a network interface that is coupled to a network for communicating therewith a packet;
   a memory for storing information;
   a circuit block that is not a general purpose processor, wherein the circuit block is configured to perform the steps of:
      determining a first type for the first network protocol and a second type for the second network protocol that is nested within the payload of the first network protocol based on information in the packet; and
      storing into the memory classification data that indicates a unique combination of the first type and the second type;
   one or more processors; and
   one or more sequences of instructions which, when executed by the one or more processors, cause the one or more processors to carry out routing the packet based at least in part on the second network protocol without performing determining the first type and the second type based on information in the packet and cause the one or more processors to carry out storing into memory, in association with the classification data, an offset value for the second network protocol, wherein the offset value indicates a number of bits for aligning the header for the second network protocol relative to a boundary of a cache line for moving data between the memory and the one or more processors.

2. The apparatus as recited in claim 1, said step of storing the packet into memory shifted by the number of bits indicated by the offset value further comprising padding a start of the packet with an arbitrary value until the packet is shifted by the number of bits indicated by the offset value.

3. The apparatus as recited in claim 1, said step of storing into memory the offset value further comprising determining the offset value for aligning a beginning of the header for the second network protocol on the boundary of the cache line.

4. The apparatus as recited in claim 1, said step of storing into memory the offset value further comprising determining the offset value based on a programmable mapping between a plurality of values for the classification data and a corresponding plurality of offset values.

5. The apparatus as recited in claim 1, said step of storing into memory the offset value further comprising storing into memory an integer value indicating an integral number of bytes.

6. The apparatus as recited in claim 1, said step of storing, into the memory, classification data further comprising storing the classification data in a descriptor record that points to a packet data buffer where the packet is stored in the memory.

7. The apparatus as recited in claim 1, said step of determining the first type and the second type further comprising comparing a value in a type field in the packet to a special value in a programmable register, thereby allowing the circuit block to identify a protocol type not known when the circuit block was designed.

8. The apparatus as recited in claim 1, said step of determining the first type and the second type further comprising determining the second type that indicates a protocol that corresponds to an Open Systems Interconnection (OSI) Reference Model layer above a data link layer.

9. The apparatus as recited in claim 8, said step of determining the first type and the second type further comprising determining the second type that indicates one of:
an Internet Protocol (IP);
a Multi-protocol Layer Switch (MPLS); and
a protocol developed after design of the circuit block, which corresponds to an Open Systems Interconnection (OSI) Reference Model layer above a data link layer.

10. The apparatus as recited in claim 1, said step of determining the first type and the second type further comprising determining the first type that indicates a protocol that corresponds to Open Systems Interconnection (OSI) Reference Model data link layer.

11. The apparatus as recited in claim 1, said one or more sequences of instructions further causing the one or more processors to carry out the step of forming a plurality of descriptor rings corresponding to a plurality of values for the classification data, wherein a descriptor ring stores a plurality of descriptor records that each point to a packet data buffer where the packet is stored in the memory.

12. The apparatus as recited in claim 11, said one or more sequences of instructions further causing the one or more processors to use a limited instruction set for processing only a particular combination of protocols when processing a packet pointed to by descriptor records in a particular descriptor ring corresponding to the particular combination of protocols, thereby reducing at least one of a number of instructions transferred from memory to an instruction cache in a processor and a number of parameters stored in a descriptor record.

13. The apparatus as recited in claim 11, said one or more sequences of instructions further causing a particular processor to process data pointed to by descriptor records in a particular descriptor ring corresponding to a particular combination of protocols, thereby reducing a number of times instructions are transferred from memory to an instruction cache in the processor.

14. An apparatus for routing information in a payload of a first network protocol, which payload includes header information for a second network protocol, comprising:
a network interface that is coupled to a network for communicating therewith a packet;
a memory for storing information;
a circuit block configured to perform the steps of:
determining a first type for the first network protocol and a second type for the second network protocol based on information in the packet,
storing into the memory classification data that indicates a unique combination of the first type and the second type,
receiving, based on the classification data, an offset value indicating a number of bits for aligning the header for the second network protocol relative to a boundary of a cache line for moving data between the memory and the one or more processors, and
storing the packet into memory shifted by the number of bits indicated by the offset value;
one or more processors; and
one or more sequences of instructions which, when executed by the one or more processors causes the one or more processors to carry out the step of:
routing the packet based at least in part on the second network protocol without performing the step of determining the first type and the second type based on information in the packet, thereby omitting processor clock cycles that would otherwise be consumed in determining the first type and the second type, and
retrieving from the memory no more than one cache line to receive the header for the second networking protocol.

15. An apparatus for routing information in a payload of a first network protocol, which payload includes header information for a second network protocol, comprising:
a network interface that is coupled to a network for communicating therewith a packet;
a memory for storing information;
a circuit block configured to perform the steps of:
determining a first type for the first network protocol and a second type for the second network protocol based on information in the packet, including comparing a value in a type field in the packet to a special value in a programmable register, thereby allowing the circuit block to identify a protocol type not known when the circuit block was designed;
storing classification data that indicates a unique combination of the first type and the second type in the memory in a descriptor record that points to a packet data buffer where the packet is stored in the memory; and
storing the packet into memory shifted by a number of bits indicated by an offset value retrieved for memory by padding a start of the packet with an arbitrary value until the packet is shifted by the number of bits indicated by the offset value;
one or more processors; and
one or more sequences of instructions which, when executed by the one or more processors, causes the one or more processors to carry out the steps of:
storing into memory, based on the classification data, the offset value indicating the number of bits for aligning a beginning of the header for the second network protocol on a boundary of a cache line for moving data between the memory and the one or more processors as an integer value indicating an integral number of bytes, including determining the offset value based on a programmable mapping between a plurality of values for the classification data and a corresponding plurality of offset values;
retrieving from the memory no more than one cache line to receive the header for the second networking protocol, which cache is aligned with the beginning of the header for the second network protocol, thereby omitting at least one of a cache line load and a cache line ejection that would otherwise be executed for finding a cache line that includes the header for the second networking protocol; and
routing the packet based at least in part on the header for the second network protocol without performing the step of determining the first type and the second type based on information in the packet, thereby omitting processor clock cycles that would otherwise be consumed in determining the first type and the second type.

16. An apparatus for routing information in a payload of a first network protocol, which payload includes a second network protocol, comprising:
   a means for communicating a packet;
   a means for determining a first type for the first network protocol and a second type for the second network protocol that is nested within the payload of the first network protocol based on information in the packet without using a general purpose processor, thereby omitting processor clock cycles that would otherwise be consumed in determining the first type and the second type;
   a means for storing classification data that indicates a unique combination of the first type and the second type without using a general purpose processor;
   a means for receiving, based on the classification data, an offset value indicating a number of bits for aligning a header for the second network protocol relative to a boundary of a cache line,
   a means for storing the packet into memory shifted by the number of bits indicated by the offset value; and
   a means for routing the packet based at least in part on the classification data.

17. A method for a network device, which includes a general purpose processor configured to execute a router operating system, for processing information in a payload of a first network protocol which payload includes a second network protocol, the method comprising the steps of:
   receiving a packet at a network device;
   determining a first type for the first network protocol and a second type for the second network protocol that is nested within a payload of the first network protocol based on information in the packet without using the general purpose processor in the network device;
   storing into memory without using the general purpose processor, classification data that indicates a unique combination of the first type and the second type;
   storing into memory an offset value for the second network protocol wherein the offset value indicates a number of bits for aligning a header for the second network protocol relative to a boundary of a cache line; and
   routing the packet based at least in part on the classification data,
   wherein determining the first type and the second type further comprises comparing a value in a type field in the packet to a special value in a programmable register of a circuit block, thereby allowing classification of a protocol type not known when the circuit block was designed.

18. The method as recited in claim 17, said step of storing, into the memory, classification data further comprising storing the classification data in a descriptor record that points to a packet data buffer where the packet is stored in the memory.

19. The method as recited in claim 17, said step of determining the first type and the second type further comprising determining the second type that indicates a protocol that corresponds to an Open Systems Interconnection (OSI) Reference Model layer above a data link layer.

20. The method as recited in claim 19, said step of determining the first type and the second type further comprising determining the second type that indicates one of:
   an Internet Protocol (IP);
   a Multi-protocol Layer Switch (MPLS); and
   a protocol developed after design of the circuit block, which corresponds to an Open Systems Interconnection (OSI) Reference Model layer above a data link layer.

21. The method as recited in claim 17, said step of determining the first type and the second type further comprising determining the first type that indicates a protocol that corresponds to Open Systems Interconnection (OSI) Reference Model data link layer.

22. A method for a network device, which includes a general purpose processor configured to execute a router operating system, for processing information in a payload of a first network protocol which payload includes header information for a second network protocol, the method comprising the steps of:
   receiving a packet at a network device;
   determining a first type for the first network protocol and a second type for the second network protocol based on information in the packet without using a general purpose processor in the network device:
   storing into memory without using the general purpose processor, classification data that indicates a unique combination of the first type and the second type;
   routing the packet based at least in part on the classification data;
   receiving an offset value indicating a number of bits for aligning the header for the second network protocol relative to a boundary of a cache line for moving data between the memory and the general purpose processor; and
   storing the packet into memory shifted by the number of bits indicated by the offset value without using the general purpose processor.

23. The method as recited in claim 22, said step of storing the packet into memory shifted by the number of bits indicated by the offset value further comprising padding a start of the packet with an arbitrary value until the packet is shifted by the number of bits indicated by the offset value.

24. The method as recited in claim 22, said step of receiving the offset value further comprising receiving the offset value for aligning a beginning of the header for the second network protocol on the boundary of the cache line.

25. The method as recited in claim 22, said step of receiving the offset value further comprising receiving an integer value indicating an integral number of bytes.

26. A method for a network device, which includes a general purpose processor configured to execute a router operating system, for processing information in a payload of a first network protocol which payload includes a second network protocol, the method comprising the steps of:
   receiving classification data that indicates a unique combination of a first type for the first network protocol and a second type for the second network protocol that is nested within the payload of the first protocol based on information in a packet received at the network device without performing the step of determining the first type and the second type based on information in the packet in a general purpose processor, thereby omitting processor clock cycles that would otherwise be consumed in determining the first type and the second type;
   receiving, based on the classification data, an offset value indicating a number of bits for aligning a header for the second network protocol relative to a boundary of a cache line;
   storing the packet into memory shifted by the number of bits indicated by the offset value; and
   routing the packet based at least in part on the classification data.

27. The method as recited in claim 26, said step of receiving classification data further comprising retrieving the classification data from a descriptor record that points to a packet data buffer where the packet is stored in memory.

28. The method as recited in claim 26, further comprising programming a special type value into a programmable register in a circuit block configured to determine the first type and the second type, thereby allowing the circuit block to identify a protocol type not known when the circuit block was designed.

29. The method as recited in claim 26, said step of receiving classification data further comprising receiving classification data that indicates the second type indicates a protocol that corresponds to an Open Systems Interconnection (OSI) Reference Model layer above a data link layer.

30. The method as recited in claim 29, said step of receiving classification data further comprising receiving classification data that indicates the second type indicates one of:
an Internet Protocol (IP);
a Multi-protocol Layer Switch (MPLS); and
a protocol developed after design of the circuit block, which corresponds to an Open Systems Interconnection (OSI) Reference Model layer above a data link layer.

31. The method as recited in claim 26, said step of receiving classification data further comprising receiving classification data that indicates the first type indicates a protocol that corresponds to Open Systems Interconnection (OSI) Reference Model data link layer.

32. The method as recited in claim 26, further comprising the step of forming a plurality of descriptor rings corresponding to a plurality of values for the classification data, wherein a descriptor ring stores a plurality of descriptor records that each point to a packet data buffer where a packet is stored in the memory.

33. The method as recited in claim 32, said step of routing the packet further comprising using a limited instruction set for processing only a particular combination of protocols when processing a packet pointed to by descriptor records in a particular descriptor ring corresponding to the particular combination of protocols, thereby reducing at least one of a number of instructions and a number of variables associated with processing the packet.

34. The method as recited in claim 32, said step of routing the packet further comprising using a particular processor to process data pointed to by descriptor records in a particular descriptor ring corresponding to a particular combination of protocols, thereby reducing a number of times instructions are transferred from memory to an instruction cache in the processor.

35. A method for a network device, which includes a general purpose processor configured to execute a router operating system, for processing information in a payload of a first network protocol which payload includes header information for a second network protocol, the method comprising the steps of:
receiving classification data that indicates a unique combination of a first type for the first network protocol and a second type for the second network protocol based on information in a packet received at the network device without performing the step of determining the first type and the second type based on information in the packet, thereby omitting processor clock cycles that would otherwise be consumed in determining the first type and the second type;
routing the packet based at least in part on the classification data; and
storing into memory, based on the classification data, an offset value indicating a number of bits for aligning the header for the second network protocol relative to a boundary of a cache line for moving data between memory and the general purpose processor without performing the step of shifting the packet in memory by the number of bits indicated by the offset value thereby omitting processor cycles that would otherwise be consumed in shifting.

36. The method as recited in claim 35, further comprising the step of retrieving from memory no more than one cache line to receive the header for the second networking protocol which is aligned with a cache line boundary, thereby omitting at least one of a cache line load and a cache line ejection that would otherwise be executed for finding a cache line that includes the header for the second networking protocol.

37. The method as recited in claim 35, said step of storing into memory the offset value further comprising determining the offset value for aligning a beginning of the header for the second network protocol on the boundary of the cache line.

38. The method as recited in claim 35, said step of storing into memory the offset value further comprising determining the offset value based on a programmable mapping between a plurality of values for the classification data and a corresponding plurality of offset values.

39. The method as recited in claim 35, said step of storing into memory the offset value further comprising storing into memory an integer value indicating an integral number of bytes.

40. A non-transitory computer-readable medium, excluding carrier waves, carrying one or more sequences of instructions for processing information in a payload of a first network protocol which payload includes a second network protocol, wherein execution of the one or more sequences of instructions by one or more processors causes the one or more processors to perform the steps of:
receiving classification data that indicates a unique combination of a first type for the first network protocol and a second type for the second network protocol that is nested within the payload of the first protocol based on information in a packet received at a network device without performing the step of determining the first type and the second type based on information in the packet, thereby omitting processor clock cycles that would otherwise be consumed in determining the first type and the second type;
receiving, based on the classification data, an offset value indicating a number of bits for aligning a header for the second network protocol relative to a boundary of a cache line;
storing the packet into memory shifted by the number of bits indicated by the offset value; and
routing the packet based at least in part on the classification data.

41. The computer-readable medium as recited in claim 40, said step of receiving classification data further comprising retrieving the classification data from a descriptor record that points to a packet data buffer where the packet is stored in memory.

42. The computer-readable medium as recited in claim 40, further comprising programming a special type value into a programmable register in a circuit block configured to determine the first type and the second type, thereby allowing the circuit block to identify a protocol type not known when the circuit block was designed.

43. The computer-readable medium as recited in claim 40, said step of receiving classification data further comprising receiving classification data that indicates the second type indicates a protocol that corresponds to an Open Systems Interconnection (OSI) Reference Model layer above a data link layer.

44. The computer-readable medium as recited in claim 43, said step of receiving classification data further comprising receiving classification data that indicates the second type indicates one of:
- an Internet Protocol (IP);
- a Multi-protocol Layer Switch (MPLS); and
- a protocol developed after design of the circuit block, which corresponds to an Open Systems Interconnection (OSI) Reference Model layer above a data link layer.

45. The computer-readable medium as recited in claim 40, said step of receiving classification data further comprising receiving classification data that indicates the first type indicates a protocol that corresponds to Open Systems Interconnection (OSI) Reference Model data link layer.

46. The computer-readable medium as recited in claim 40, said one or more sequences of instructions further causing the one or more processors to carry out the step of forming a plurality of descriptor rings corresponding to a plurality of values for the classification data, wherein a descriptor ring stores a plurality of descriptor records that each point to a packet data buffer where the packet is stored in the memory.

47. The computer-readable medium as recited in claim 46, said one or more sequences of instructions further causing the one or more processors to use a limited instruction set for processing only a particular combination of protocols when processing a packet pointed to by descriptor records in a particular descriptor ring corresponding to the particular combination of protocols, thereby reducing at least one of a number of instructions transferred from memory to an instruction cache in a processor and a number of parameters stored in a descriptor record.

48. The computer-readable medium as recited in claim 46, said one or more sequences of instructions further causing a particular processor to process data pointed to by descriptor records in a particular descriptor ring corresponding to a particular combination of protocols, thereby reducing a number of times instructions are transferred from memory to an instruction cache in the particular processor.

49. A non-transitory computer-readable medium, excluding carrier waves, carrying one or more sequences of instructions for processing information in a payload of a first network protocol which payload includes header information for a second network protocol, wherein execution of the one or more sequences of instructions by one or more processors causes the one or more processors to perform the steps of:
- receiving classification data that indicates a unique combination of a first type for the first network protocol and a second type for the second network protocol based on information in a packet received at a network device without performing the step of determining the first type and the second type based on information in the packet, thereby omitting processor clock cycles that would otherwise be consumed in determining the first type and the second type; and
- routing the packet based at least in part on the classification data; and
- storing into memory, based on the classification data, an offset value indicating a number of bits for aligning the header for the second network protocol relative to a boundary of a cache line for moving data between memory and the one or more processors without performing the step of shifting the packet in memory by the number of bits indicated by the offset value, thereby omitting processor cycles that would otherwise be consumed in shifting.

50. The computer-readable medium as recited in claim 49, wherein execution of the one or more sequences of instructions further causes the one or more processors to perform the step of retrieving from memory no more than one cache line to receive the header for the second networking protocol which is aligned with a cache line boundary, thereby omitting at least one of a cache line load and a cache line ejection that would otherwise be executed for finding a cache line that includes the header for the second networking protocol.

51. The computer-readable medium as recited in claim 49, said step of storing into memory the offset value further comprising determining the offset value for aligning a beginning of the header for the second network protocol on the boundary of the cache line.

52. The computer-readable medium as recited in claim 49, said step of storing into memory the offset value further comprising determining the offset value based on a programmable mapping between a plurality of values for the classification data and a corresponding plurality of offset values.

53. The computer-readable medium as recited in claim 49, said step of storing into memory the offset value further comprising storing into memory an integer value indicating all integral number of bytes.

\* \* \* \* \*